US011888265B2

(12) United States Patent
Kumaki et al.

(10) Patent No.: US 11,888,265 B2
(45) Date of Patent: Jan. 30, 2024

(54) SHIELDED CONNECTOR HAVING A FIRST METAL MEMBER WITH A CONTACTING PORTION CONTACTING A SECOND AND A THIRD METAL MEMBER

(71) Applicant: Japan Aviation Electronics Industry, Limited, Tokyo (JP)

(72) Inventors: Takashi Kumaki, Tokyo (JP); Hiroto Nishimori, Tokyo (JP); Tomoyuki Hirano, Tokyo (JP)

(73) Assignee: JAPAN AVIATION ELECTRONICS INDUSTRY, LIMITED, Tokyo (JP)

( * ) Notice: Subject to any disclaimer, the term of this patent is extended or adjusted under 35 U.S.C. 154(b) by 0 days.

(21) Appl. No.: 17/584,882

(22) Filed: Jan. 26, 2022

(65) Prior Publication Data

US 2022/0263274 A1 Aug. 18, 2022

(30) Foreign Application Priority Data

Feb. 17, 2021 (JP) ................................ 2021-023659

(51) Int. Cl.
*H01R 13/6581* (2011.01)

(52) U.S. Cl.
CPC ................................ *H01R 13/6581* (2013.01)

(58) Field of Classification Search
CPC .................................................. H01R 13/6581
USPC .................................................... 439/607.27
See application file for complete search history.

(56) References Cited

U.S. PATENT DOCUMENTS 5,980,320 A * 11/1999 Slack .................. H01R 13/659
439/676
6,155,872 A * 12/2000 Wu ....................... H01R 27/02
439/541.5
6,383,024 B1 * 5/2002 Wang ..................... H01R 24/62
439/607.23
7,753,733 B2 * 7/2010 Kameyama .......... H01R 12/724
439/607.35
7,771,235 B2 * 8/2010 Kameyama .......... H01R 13/648
439/607.27
7,967,631 B2 * 6/2011 Wang ................... H01R 13/648
439/541.5
8,109,791 B2 * 2/2012 Kameyama ............ H01R 12/00
439/607.37
(Continued)

FOREIGN PATENT DOCUMENTS

EP 2827459 A1 * 1/2015 ........... H01R 13/506
EP 2827459 A1 1/2015
(Continued)

OTHER PUBLICATIONS

European Patent Office, "Extended European Search Report and Search Opinion for European Patent Application 22155223.5," dated Jul. 1, 2022.

*Primary Examiner* — Peter G Leigh
(74) *Attorney, Agent, or Firm* — Manabu Kanesaka

(57) ABSTRACT

A shield-type connector includes: an inner shell made of metal and provided in an inner housing; an outer shell made of metal and provided in an outer housing; and a cover shell made of metal and contacting with both of the inner shell and the outer shell, in which the inner shell, the outer shell and the cover shell include contact portions that contact with each other, and the contact portion of the cover shell is inserted between the contact portion of the inner shell and the contact portion of the outer shell.

9 Claims, 20 Drawing Sheets

(56) References Cited

U.S. PATENT DOCUMENTS

| | | | | |
|---|---|---|---|---|
| 8,870,596 | B2 * | 10/2014 | Ii ........................ | H01R 13/6581 439/607.41 |
| 9,401,567 | B2 * | 7/2016 | Miyoshi ............. | H01R 13/6594 |
| 9,472,907 | B2 * | 10/2016 | Kao ................... | H01R 13/6595 |
| 9,559,469 | B2 * | 1/2017 | Nishimori .......... | H01R 13/6597 |
| 9,972,950 | B2 * | 5/2018 | Kawakami ......... | H01R 13/6594 |
| 2009/0318025 | A1 | 12/2009 | Kameyama | |
| 2013/0059472 | A1 * | 3/2013 | Saito .................... | H01R 13/648 439/607.27 |

FOREIGN PATENT DOCUMENTS

| | | | | | |
|---|---|---|---|---|---|
| EP | 3086416 | A1 | | 10/2016 | |
| JP | 2005-038725 | A | | 2/2005 | |
| JP | 2005038725 | A | * | 2/2005 | ........... H01R 13/648 |

* cited by examiner

Prior Art

SHIELDED CONNECTOR HAVING A FIRST METAL MEMBER WITH A CONTACTING PORTION CONTACTING A SECOND AND A THIRD METAL MEMBER

RELATED APPLICATIONS

The present application is based on and claims priority from, Japanese Patent Applications No. 2021-023659 filed Feb. 17, 2021, the disclosure of which is hereby incorporated by reference herein in its entirety.

BACKGROUND OF THE INVENTION

Field of the Invention

The present invention relates to a shield-type connector.

Description of the Related Art

Conventionally, there is known a shield-type connector that is shielded by an inner shell made of metal and an outer shell made of metal (see Japanese Patent Laid-Open No. 2005-38725, for example).

For example, as shown in FIG. 19 and FIG. 20, a conventional shield-type connector includes a back shell (5: cover shell) that contacts with both of a front shell (4: inner shell) and an external shell (7: outer shell). This conventional example has a structure in which a bending piece (51) of the back shell (5) contacts with the outside of a side surface of the front shell (4) and a spring piece (55) of the back shell (5) contacts with the inside of a side surface of the external shell (7).

Reference numerals about the description of the prior patent document are discriminated from those about embodiments of the present application, by putting parentheses.

However, in the structure of the conventional shield-type connector disclosed in Japanese Patent Laid-Open No. 2005-38725, a ground conduction path from the front shell (4) to the external shell (7) goes around the bending piece (51) and the spring piece (55) over the whole length of them, and therefore, there is a problem in that the ground conduction path is long and the shield performance is low. In addition, in the structure in the conventional example, the bending piece (51) and the spring piece (55) are disposed on the side surface of the back shell (5) side by side, and therefore, there is a structural problem in that the occupation region of the bending piece (51) and the spring piece (55) on the side surface of the back shell (5) is large and it is difficult to enhance the shield performance by increasing the numbers of bending pieces (51) and spring pieces (55).

Consequently, the present invention has an object to provide a shield-type connector having a higher shield performance compared to the related art.

SUMMARY OF THE INVENTION

A shield-type connector in the present invention is a shield-type connector including: an inner shell made of metal and provided in an inner housing; an outer shell made of metal and provided in an outer housing; and a cover shell made of metal and contacting with both of the inner shell and the outer shell, in which the inner shell, the outer shell and the cover shell include contact portions that contact with each other, and the contact portion of the cover shell is inserted between the contact portion of the inner shell and the contact portion of the outer shell.

That is, in the shield-type connector in the present invention, since the contact portion of the cover shell is inserted between the contact portion of the inner shell and the contact portion of the outer shell, all of the contact portions of the three components overlap at the same position, and it is possible to shorten the path length of the ground conduction path because the path length corresponds to the length in the thickness direction of the contact portions, and it is possible to reduce the occupation region of the contact portions.

Further, in the shield-type connector in the present invention, each of the contact portions respectively included in the inner shell, the outer shell and the cover shell may be formed by one of three kinds of shape portions that include a spring plate shape portion having elastic force, a protrusion shape portion protruding to a contact side and a flat plate shape portion having a flat plate shape, and the contact portion of the cover shell may be inserted between the contact portion of the inner shell and the contact portion of the outer shell.

Further, in the shield-type connector in the present invention, one of the contact portion of the inner shell and the contact portion of the outer shell may be the spring plate shape portion having the elastic force, and the other of the contact portion of the inner shell and the contact portion of the outer shell may be the protrusion shape portion protruding to the contact side, and the contact portion of the cover shell may be the flat plate shape portion having the flat plate shape.

Further, in the shield-type connector in the present invention, each of the contact portion of the inner shell and the contact portion of the outer shell may be the spring plate shape portion having the elastic force, and the contact portion of the cover shell may be the flat plate shape portion having the flat plate shape.

Further, in the shield-type connector in the present invention, each of the contact portion of the inner shell and the contact portion of the outer shell may be the flat plate shape portion having the flat plate shape, and the contact portion of the cover shell may be the spring plate shape portion having the elastic force.

Further, in the shield-type connector in the present invention, one of the contact portion of the inner shell and the contact portion of the outer shell may be the spring plate shape portion having the elastic force, and the other of the contact portion of the inner shell and the contact portion of the outer shell may be the flat plate shape portion having the flat plate shape, and the contact portion of the cover shell may be the protrusion shape portion protruding to the contact side.

Furthermore, in the shield-type connector in the present invention, the spring plate shape portion may be a spring piece that has a cantilever shape and that extends from a rear side of the shield-type connector to a front side of the shield-type connector, the flat plate shape portion may be a flat plate that extends from the rear side of the shield-type connector to the front side of the shield-type connector, and the contact portion of the cover shell may be inserted from the rear side of the shield-type connector toward between the contact portion of the inner shell and the contact portion of the outer shell.

Moreover, in the shield-type connector in the present invention, the inner shell may include two side surfaces each of which includes at least one contact portion and a top surface that includes at least one contact portion, the outer shell may include two side surfaces each of which includes at least one contact portion and a top surface or a rear surface that includes at least one contact portion, and the cover shell may include two side surfaces each of which includes at least one contact portion and a top surface that includes at least one contact portion.

Moreover, in the shield-type connector in the present invention, the outer shell may include a rear surface that includes at least one contact portion and that covers an upper half of the outer housing, and the cover shell may include a rear surface that covers a lower half of the outer housing.

According to the present invention, it is possible to obtain a shield-type connector in which the shield performance is improved by shortening the path length of the ground conduction path. Further, according to the shield-type connector in the present invention, the occupation region of the contact portions is small, and therefore it is easy to enhance the shield performance by increasing the number of contact portions.

DETAILED DESCRIPTION OF THE PREFERRED EMBODIMENTS

Preferred embodiments for carrying out the present invention will be described below with use of the drawings. The following embodiments do not limit the invention in each claim, and all combinations of the characteristics described in the embodiments are not essential for the solution in the invention.

Figure 10:
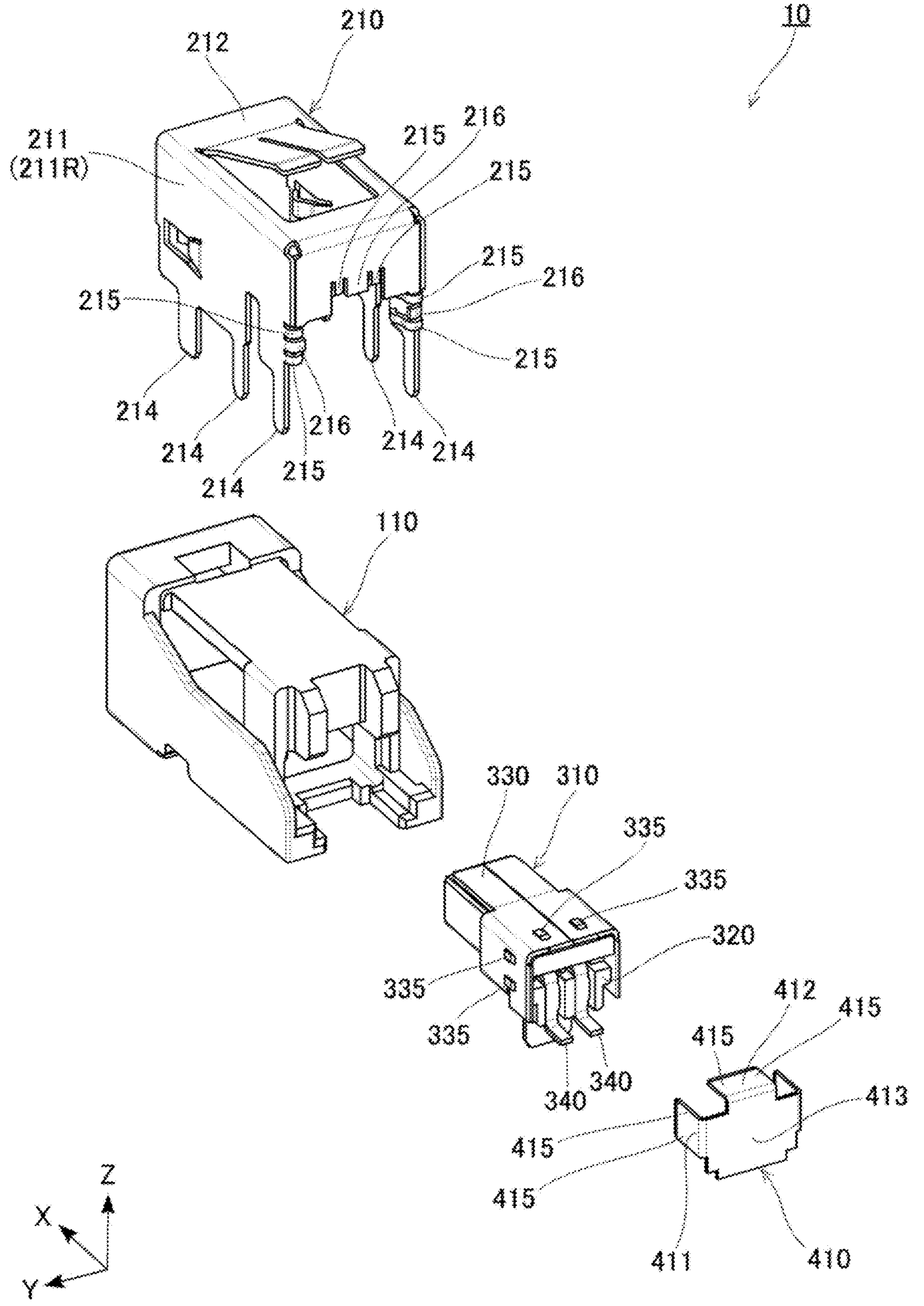
FIG. 10 is an exploded perspective view of the shield-type connector in the embodiment.

As shown in FIG. 10, a shield-type connector 10 in an embodiment includes an outer housing 110 made of resin, an outer shell 210 made of metal and provided in the outer housing 110, an inner terminal portion 310 provided in the outer housing 110, and a cover shell 410 made of metal and disposed so as to cover the inner terminal portion 310 against the outer housing 110 in which the inner terminal portion 310 is provided, as principal constituent members.

Figure 11:
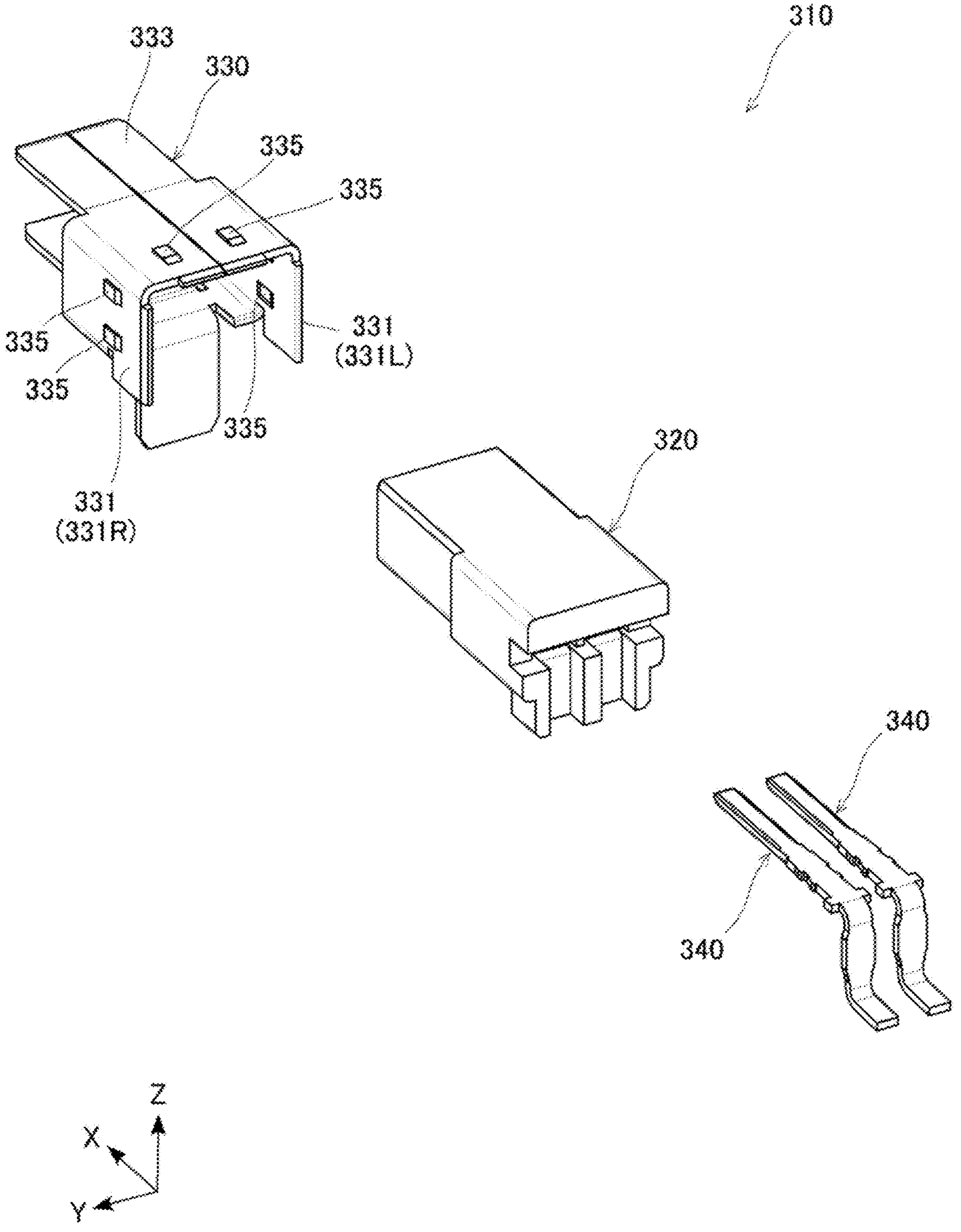
FIG. 11 is an exploded perspective view of an inner terminal portion constituting the shield-type connector in the embodiment.

As shown in FIG. 11, the inner terminal portion 310 in the embodiment includes an inner housing 320 made of resin, an inner shell 330 made of metal and provided outside of the inner housing 320, and metal terminals 340 provided so as to be inserted into the interior of the inner housing 320.

As shown in FIG. 6 to FIG. 9, the shield-type connector 10 in the embodiment includes the outer shell 210 made of metal and provided in the outer housing 110 and a cover shell 410 made of metal and contacting with both of the inner shell 330 and the outer shell 210, and thereby fulfills a function as the shield-type connector 10 having shield performance.

With reference to FIG. 1 to FIG. 5, in the shield-type connector 10 in the embodiment, an unillustrated partner-side connector is inserted into an opening portion that is opened on the front side, and thereby the shield-type connector 10 in the embodiment and the partner-side connector are electrically connected. Further, for example, the bottom surface side of the shield-type connector 10 is fixed and connected to an upper surface of an unillustrated substrate or the like, and thereby the shield-type connector 10 in the embodiment can be connected to a circuit wiring formed on a substrate surface.

In the embodiment, for explanatory convenience, a first direction, a second direction and a third direction are defined. In the embodiment, the first direction is a front-rear direction. In the figure, the front-rear direction is shown as an X-direction. Particularly, the forward direction is shown as a +X-direction, and the rearward direction is shown as a −X-direction. Further, in the embodiment, the second direction is a right-left direction. In the figure, the right-left direction is shown as a Y-direction. Particularly, the rightward direction is shown as a +Y-direction, and the leftward direction is shown as a −Y-direction. Furthermore, in the embodiment, the third direction is a top-bottom direction. In the figure, the top-bottom direction is shown as a Z-direction. Particularly, the upward direction is shown as a +Z-direction, and the downward direction is shown as a −Z-direction.

As shown in FIG. 10, the outer housing 110 in the embodiment is a resin member including an opening that passes in a direction parallel to the X-direction that is the first direction. The inner terminal portion 310 is fit into the outer housing 110 from the rear side toward the front side, and thereby the inner terminal portion 310 can be provided within an opening portion of the outer housing 110. Further, the outer shell 210 is fit into the outer housing 110 from the upper side toward the lower side, and thereby the outer shell 210 can be provided so as to cover the upper side of the outer housing 110 and an upper half of the back surface of the outer housing 110. Furthermore, the cover shell 410 is fit into the outer housing 110 from the rear side toward the front side, and thereby the cover shell 410 can be provided so as to cover a lower half of a back surface of the outer housing 110 on the back surface side of inner terminal portion 310 (see FIG. 1 to FIG. 5 also).

Figure 12:
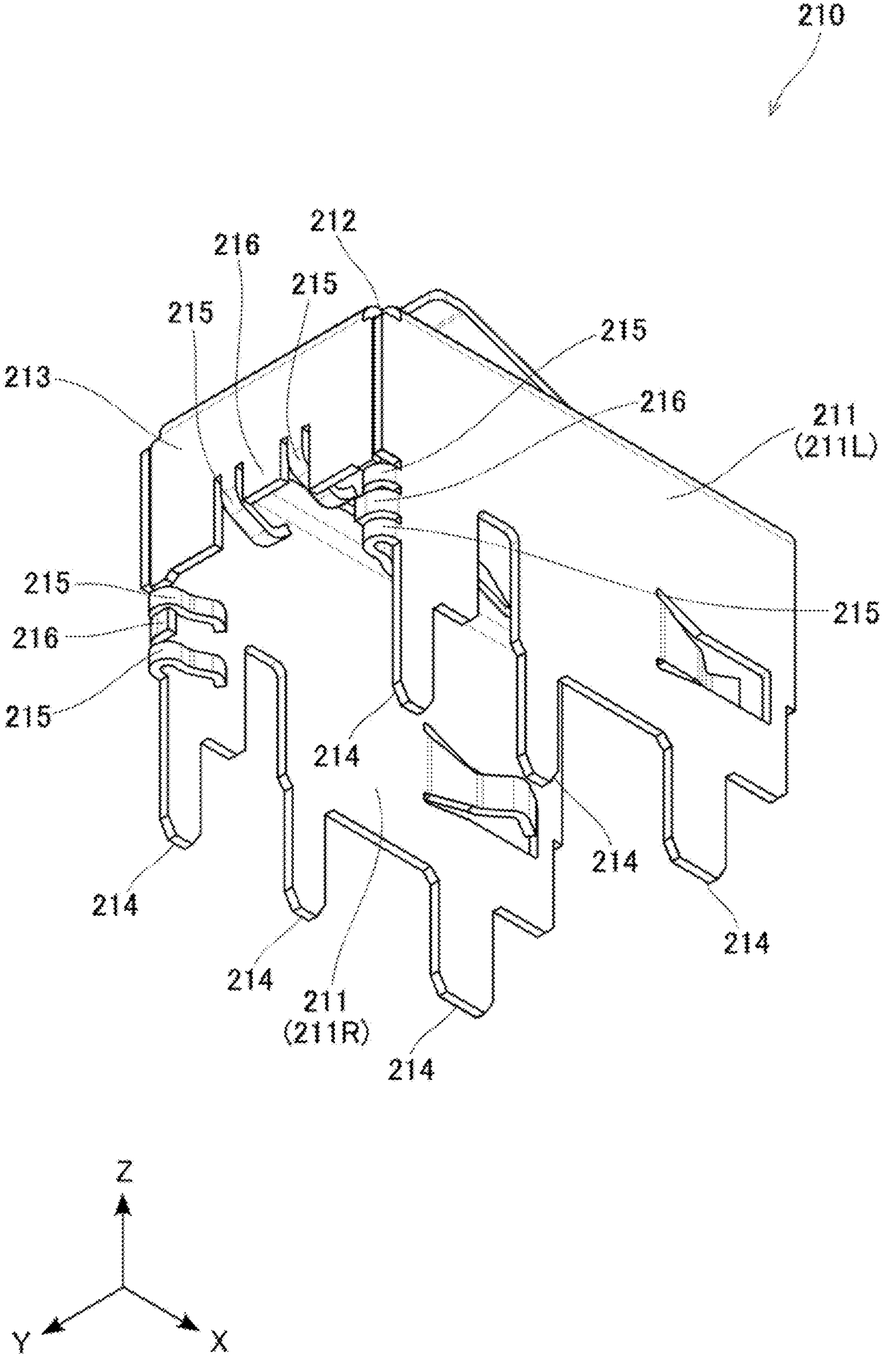
FIG. 12 is a perspective view of an outer shell constituting the shield-type connector in the embodiment as viewed from a lower back left side.

As shown in FIG. 12, the outer shell 210 in the embodiment includes two side surfaces 211, one top surface 212 and one rear surface 213.

On the lower side of the two side surfaces 211 constituting the outer shell 210, three leg portions 214 are formed for each side surface 211, that is, six leg portions 214 in total are formed. The six leg portions 214 are fit and pressed into the outer housing 110 in the −Z-direction from the upper side toward the lower side, and thereby the outer shell 210 is fixed to the outer housing 110. Further, the six leg portions 214 can be used when the bottom surface side of the shield-type connector 10 is fixed and connected to the upper surface of the unillustrated substrate or the like.

Spring plate shape portions 215 as contact portions that contact with the cover shell 410 are formed on each rear side of the two side surfaces 211 constituting the outer shell 210 and the lower side of the one rear surface 213. Two spring plate shape portions 215 are formed on a right side surface 211R of the two side surfaces 211, and two spring plate shape portions 215 are formed on a left side surface 211L. Further, two spring plate shape portions 215 are formed on the lower side of the rear surface 213. That is, six spring plate shape portions 215 in total are formed on the outer shell 210 in the embodiment.

Each of the six spring plate shape portions 215 formed on the outer shell 210 is formed as a spring piece that has a cantilever shape and that extends from the rear side of the shield-type connector 10 toward the front side of the shield-type connector 10. More specifically, as shown in FIG. 6 to FIG. 9 and FIG. 12, on the two side surfaces 211, roots of oblong pieces extending rearward from the respective rear sides of the left and right side surfaces 211L, 211R are bent to the inside of the outer shell 210, and distal end sides of the pieces are formed so as to be oriented forward, such that a roughly J-shape is shown in bottom view. Thereby, the spring plate shape portions 215 in the embodiment are formed. Further, on the one rear surface 213, a root of an oblong piece extending downward from the lower side is bent to the inside of the outer shell 210, and a distal end side of the piece is formed so as to be oriented forward, such that a roughly J-shape or a roughly L-shape is shown in lateral view. Thereby, the spring plate shape portion 215 in the embodiment is formed. The spring plate shape portion 215 in the embodiment has a roughly J-shape or a roughly L-shape as the external shape, and the spring plate shape portion 215 that is the contact portion can exert elastic force.

As shown in FIG. 11, the inner housing 320 constituting the inner terminal portion 310 in the embodiment is a resin member having a nearly rectangular shape. The metal terminals 340 are fit into the inner housing 320 in the embodiment from the rear side toward the front side, and thereby the metal terminals 340 can be provided in the inner housing 320. For example, the metal terminal 340 is a member that is used for the connection with the circuit wiring formed on the substrate surface when the bottom surface side of the shield-type connector 10 is fixed and connected to the upper surface of the unillustrated substrate or the like. Further, the inner shell 330 is fit into the inner housing 320 in the embodiment from the front side toward the rear side, and thereby the inner shell 330 can be provided so as to cover an outer circumference surface of the inner housing 320.

Figure 13:
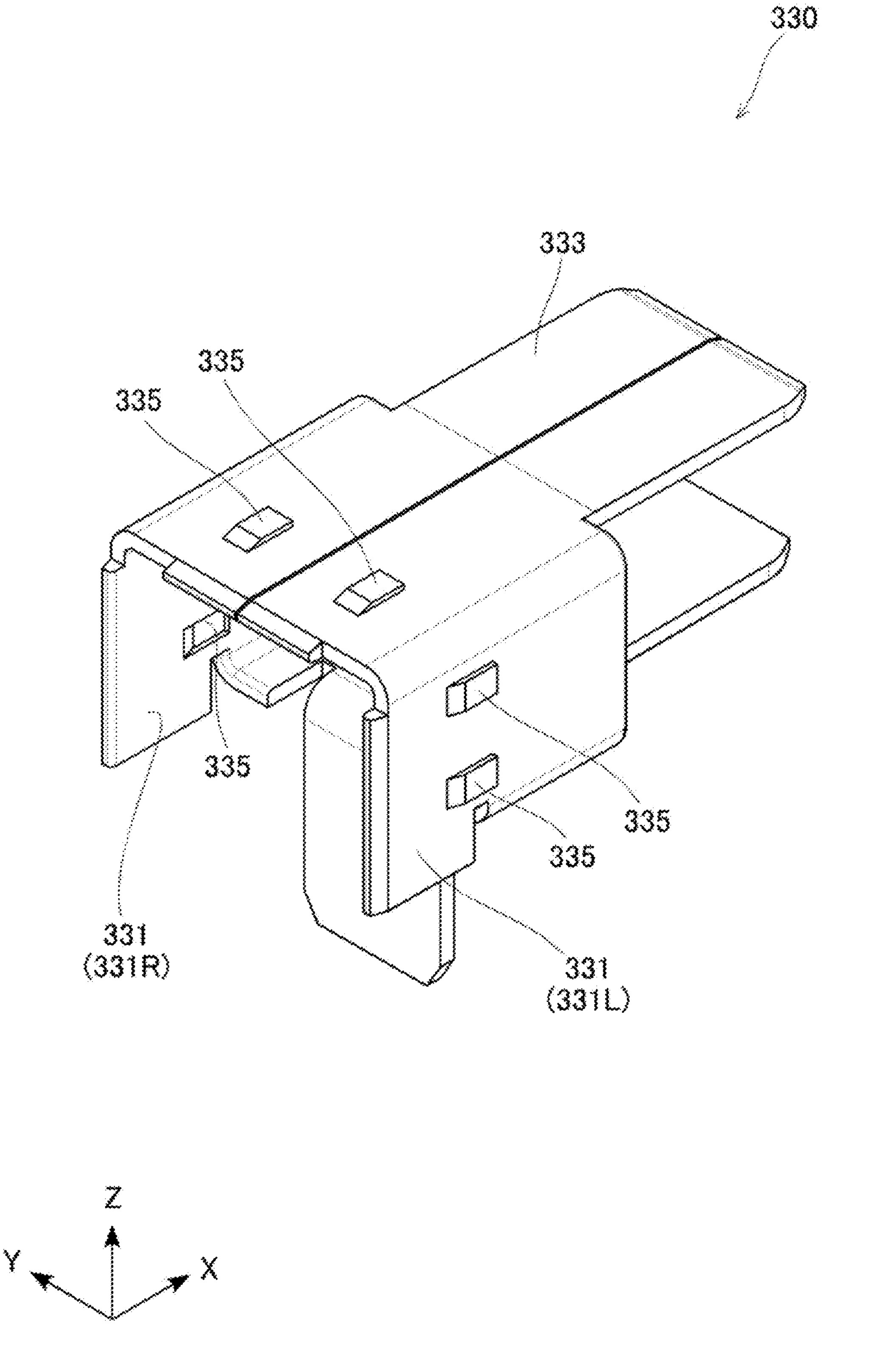
FIG. 13 is a perspective view of an inner shell constituting the shield-type connector in the embodiment as viewed from an upper back left side.

As shown in FIG. 11 and FIG. 13, the inner shell 330 in the embodiment is a metal member including an opening that passes in a direction parallel to the X-direction that is the first direction. The inner shell 330 is fit into the inner housing 320 from the front side toward the rear side, and thereby the inner housing 320 can be provided within the opening of the inner shell 330.

Protrusion shape portions 335 as contact portions that contact with the cover shell 410 are formed on the two respective side surfaces 331 including the right and left side surfaces 331 and the one top surface 333 that constitute the inner shell 330. Two protrusion shape portions 335 are formed on a right side surface 331R of the two side surfaces 331, and two protrusion shape portions 335 are formed on a left side surface 331L. Further, two protrusion shape portions 335 are formed on the top surface 333. That is, six protrusion shape portions 335 in total are formed on the inner shell 330 in the embodiment.

The six protrusion shape portions 335 formed on the inner shell 330 are sites formed as protrusions that protrude to contact sides, that is, to sides of the contact with the cover shell 410.

Figure 14:
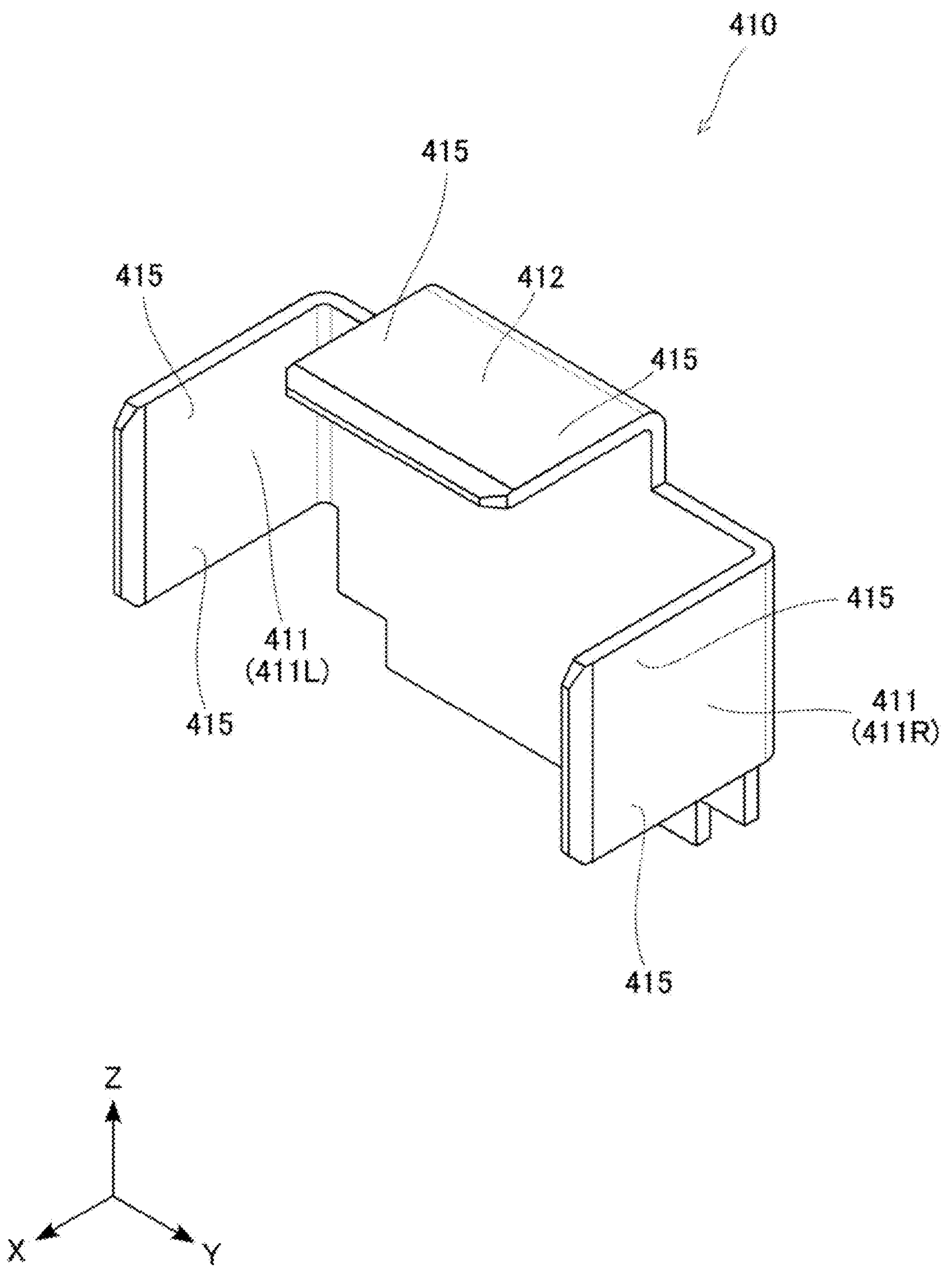
FIG. 14 is a perspective view of a cover shell constituting the shield-type connector in the embodiment as viewed from an upper front right side.

As shown in FIG. 10 and FIG. 14, the cover shell 410 in the embodiment includes two side surfaces 411, one top surface 412 and one rear surface 413. Flat plate shape portions 415 as contact portions that contact with the inner shell 330 and the outer shell 210 are formed on the respective upper sides and lower sides of the two side surfaces 411 and the right side and left side of the one top surface 412. Two flat plate shape portions 415 are formed on a right side surface 411R of the two side surfaces 411, and two flat plate shape portions 415 are formed on a left side surface 411L. Further, two flat plate shape portions 415 are formed on the top surface 412. That is, six flat plate shape portions 415 in total are formed on the cover shell 410 in the embodiment.

The six flat plate shape portions 415 as the contact portions formed on the cover shell 410 in the embodiment are sites configured as plate members that have a flat plate shape and that extend from the rear side of the shield-type connector 10 to the front side of the shield-type connector 10. The flat plate shape portion 415 is fit and sandwiched between the spring plate shape portion 215 and protrusion shape portion 335 that are contact portions respectively included in the inner shell 330 and the outer shell 210, and thereby the contact state among the inner shell 330, the outer shell 210 and the cover shell 410 is realized. On this occasion, a sure contact state among the inner shell 330, the outer shell 210 and the cover shell 410 is maintained by a cooperative action of the elastic force of the spring plate shape portion 215 and the protrusion shape of the protrusion shape portion 335.

Figure 7:
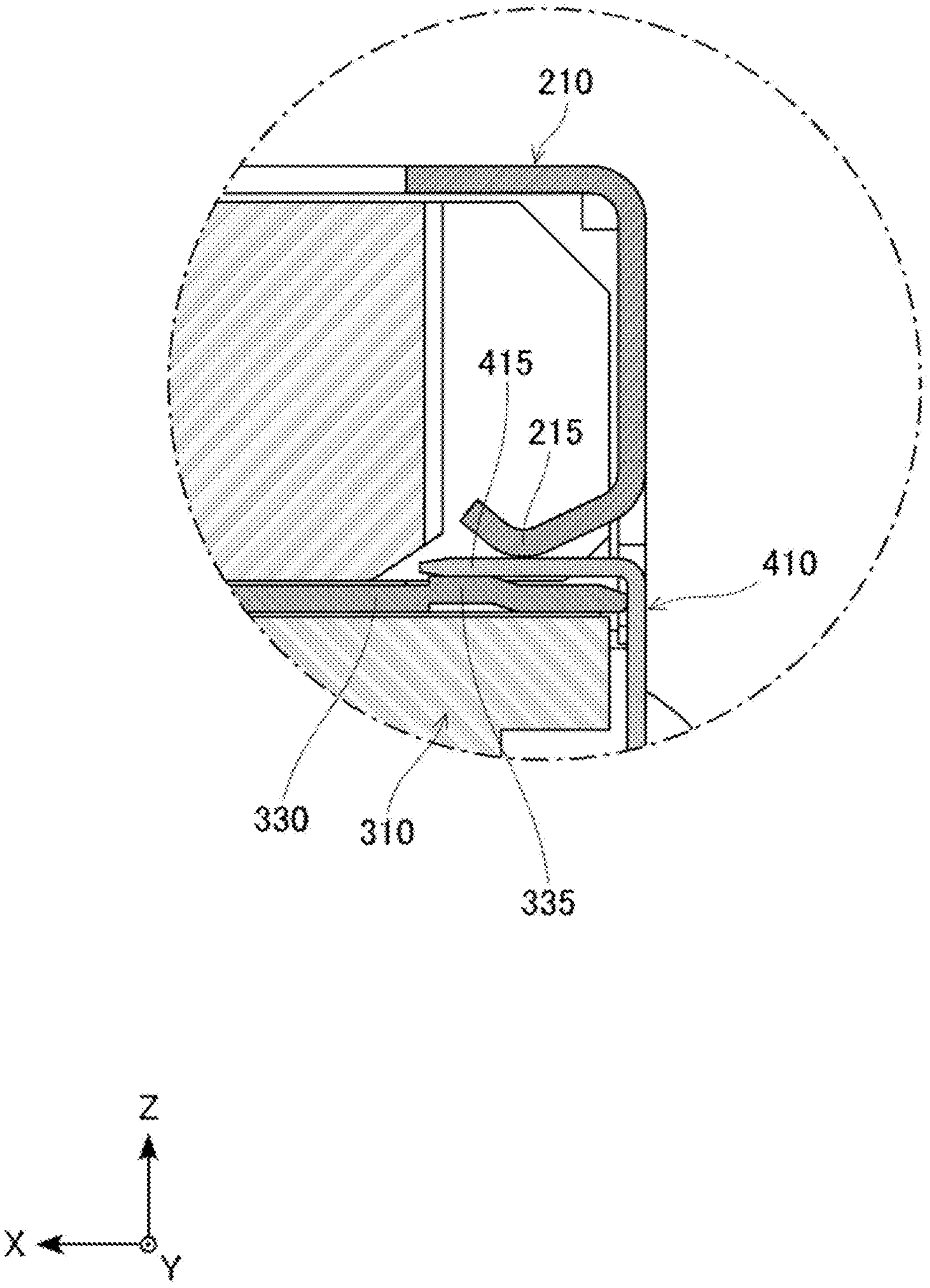
FIG. 7 is a principal-part enlarged sectional view in which a region indicated by reference character C in FIG. 6 is enlarged.
Figure 8:
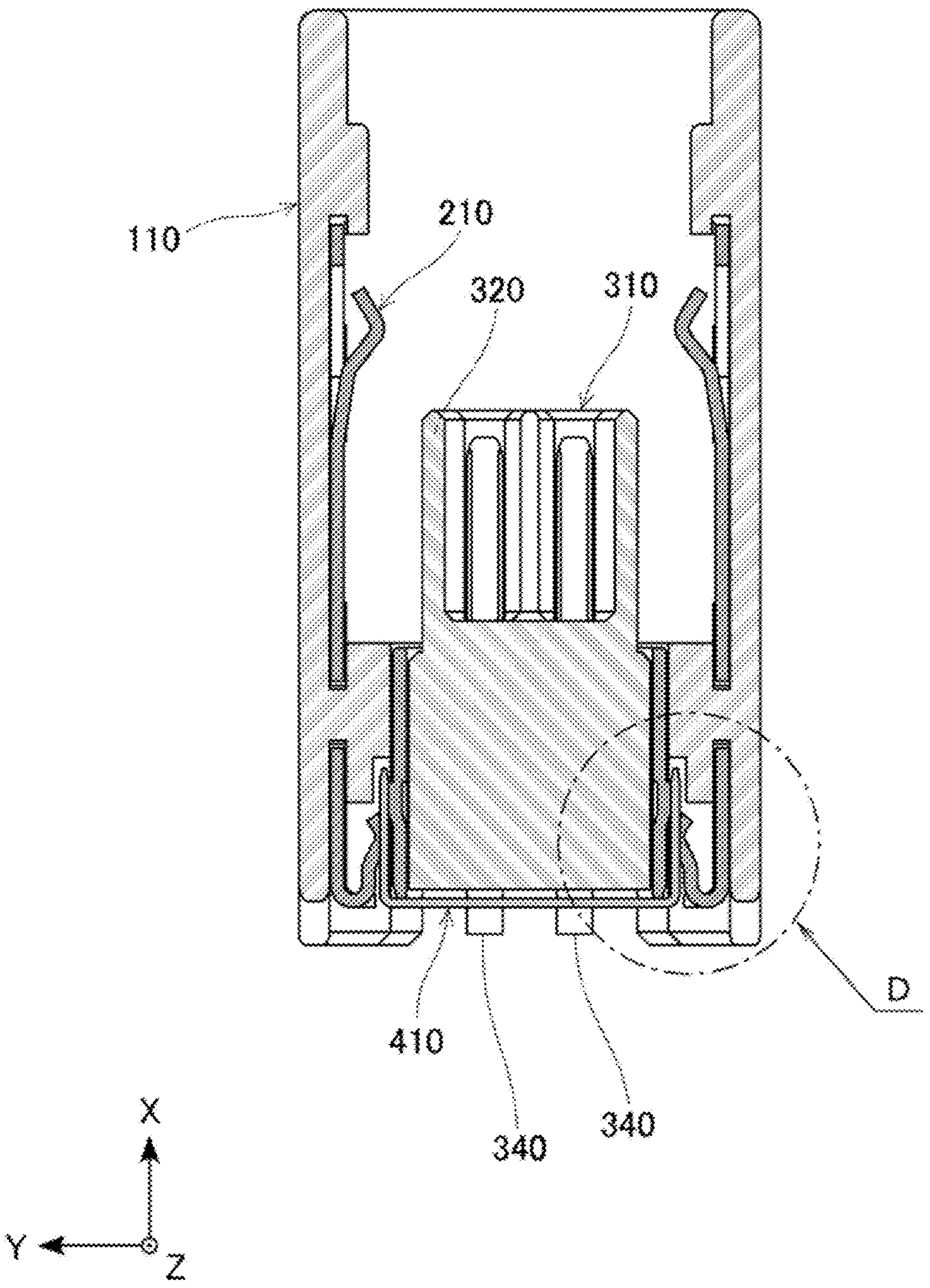
FIG. 8 is a sectional view showing a transverse section of a spot indicated by a line shown by reference characters B, B in FIG. 4.
Figure 9:
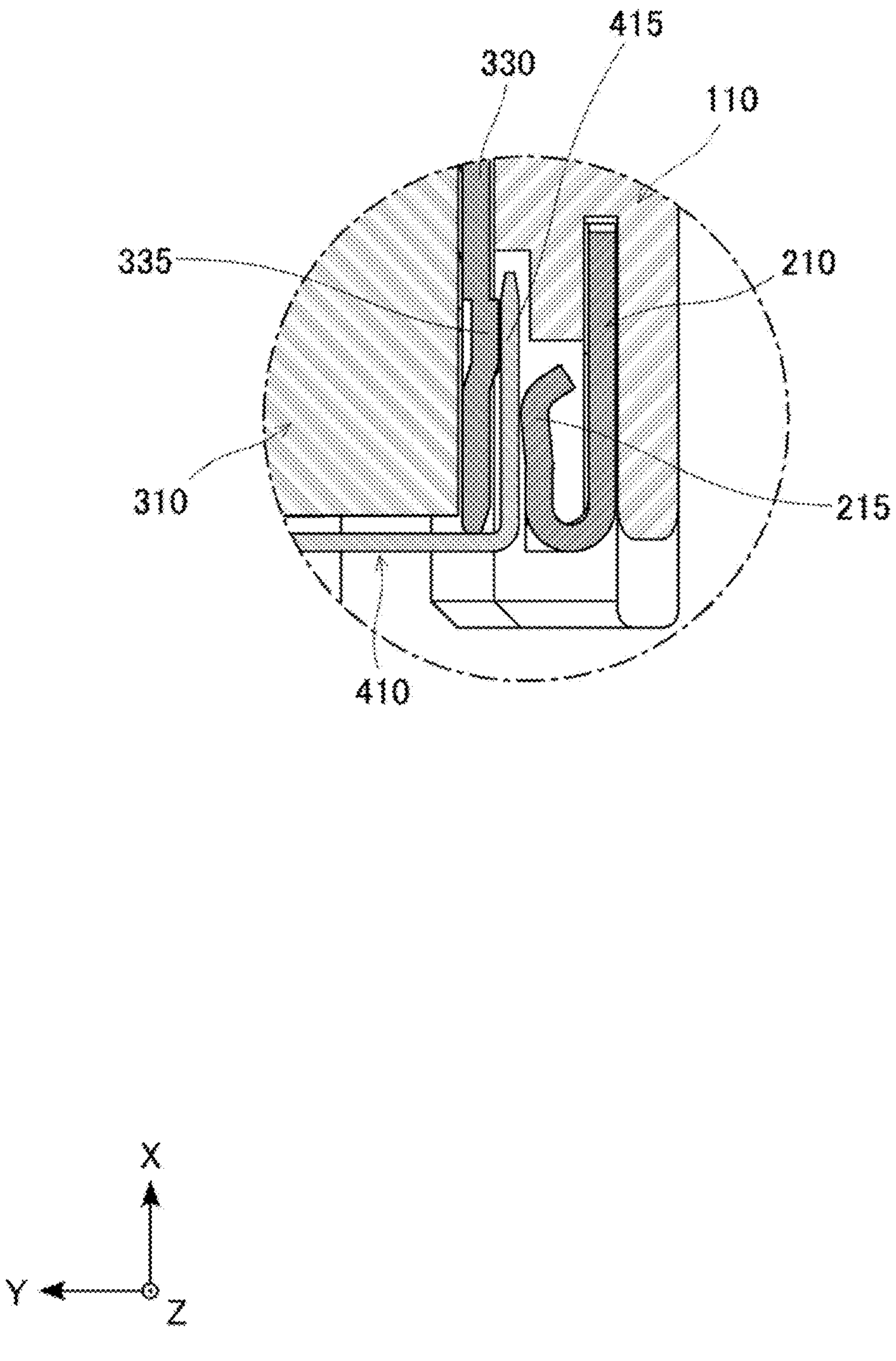
FIG. 9 is a principal-part enlarged sectional view in which a region indicated by reference character D in FIG. 8 is enlarged.

Furthermore, as is clear with reference to FIG. 7 and FIG. 9, the spring plate shape portion 215 of the outer shell 210, the protrusion shape portion 335 of the inner shell 330 and the flat plate shape portion 415 of the cover shell 410 are configured to contact with each other at close positions. With this configuration, by forming a ground conduction path in the thickness direction of the contact portions, it is possible to shorten the path length and to obtain a shield-type connector in which the shield-performance is improved. Further, with the spring plate shape portion 215 of the outer shell 210, the protrusion shape portion 335 of the inner shell 330 and the flat plate shape portion 415 of the cover shell 410 in the configuration of the embodiment, the occupation region of the contact portions is small, and therefore it is easy to increase the number of contact portions, for example. Therefore, according to the embodiment, it is easy to enhance the shield performance by increasing the contact portion.

Figure 1:
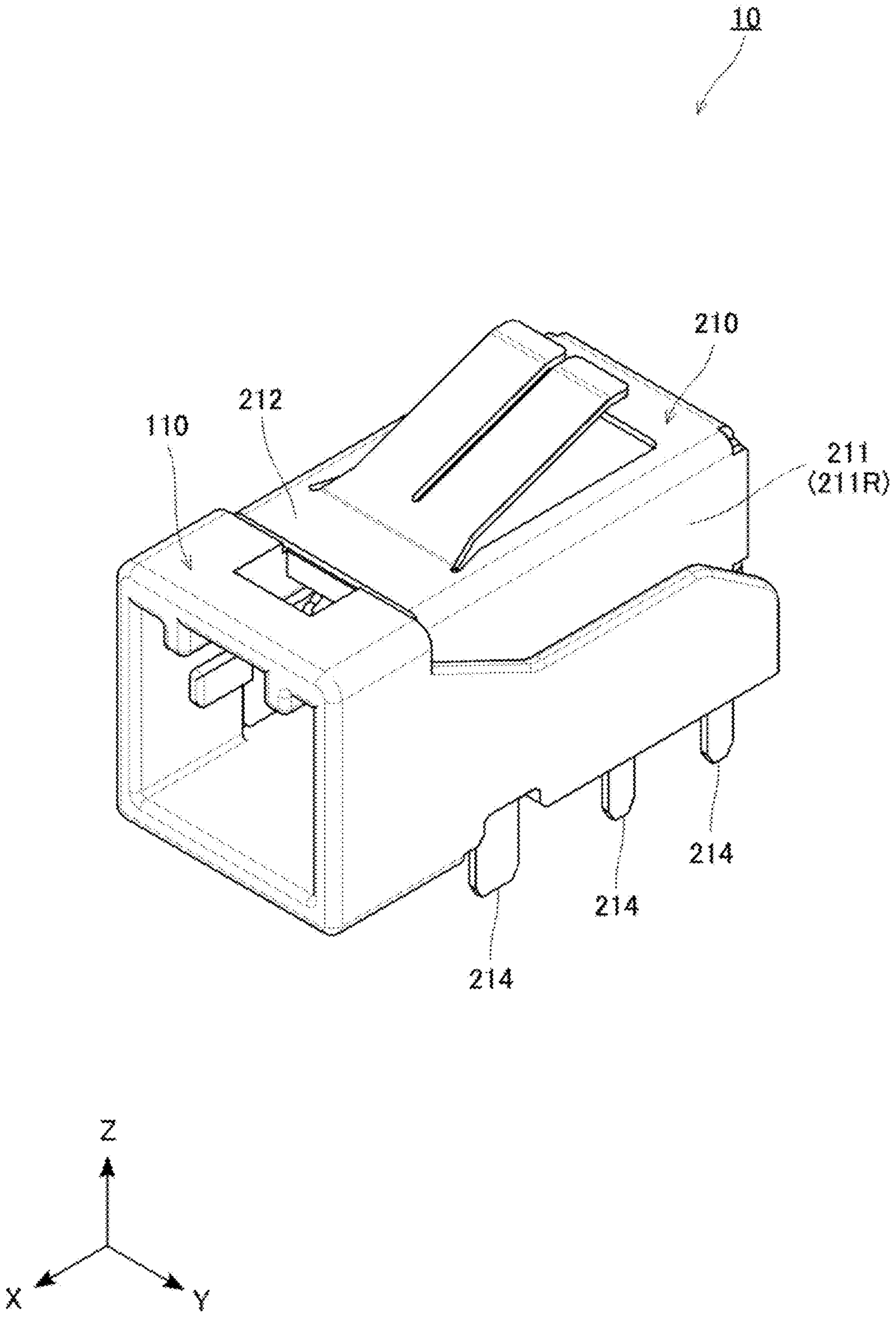
FIG. 1 is a perspective view of a shield-type connector in an embodiment as viewed from an upper front right side.
Figure 2:
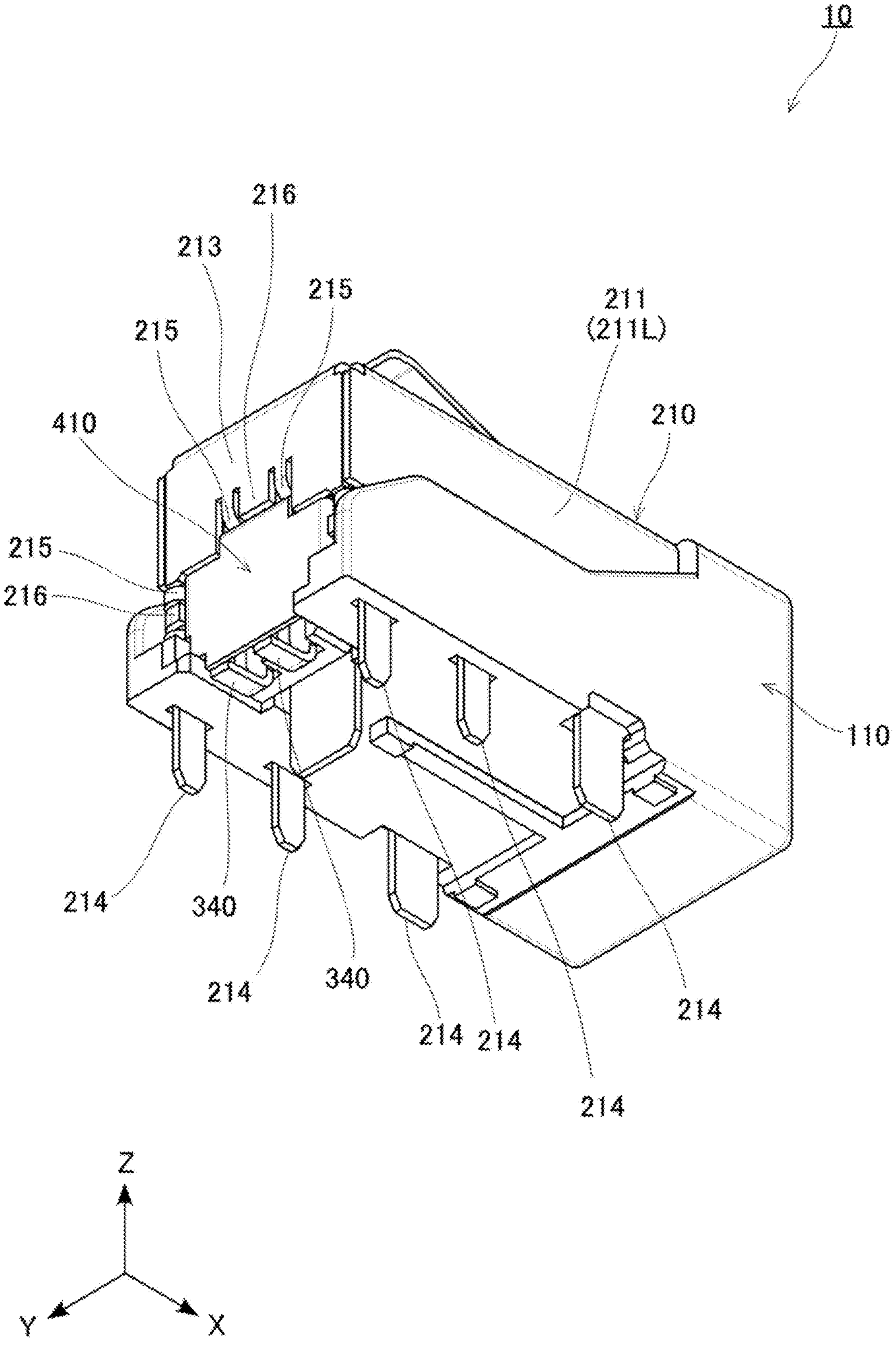
FIG. 2 is a perspective view of the shield-type connector in the embodiment as viewed from a lower back left side.
Figure 3:
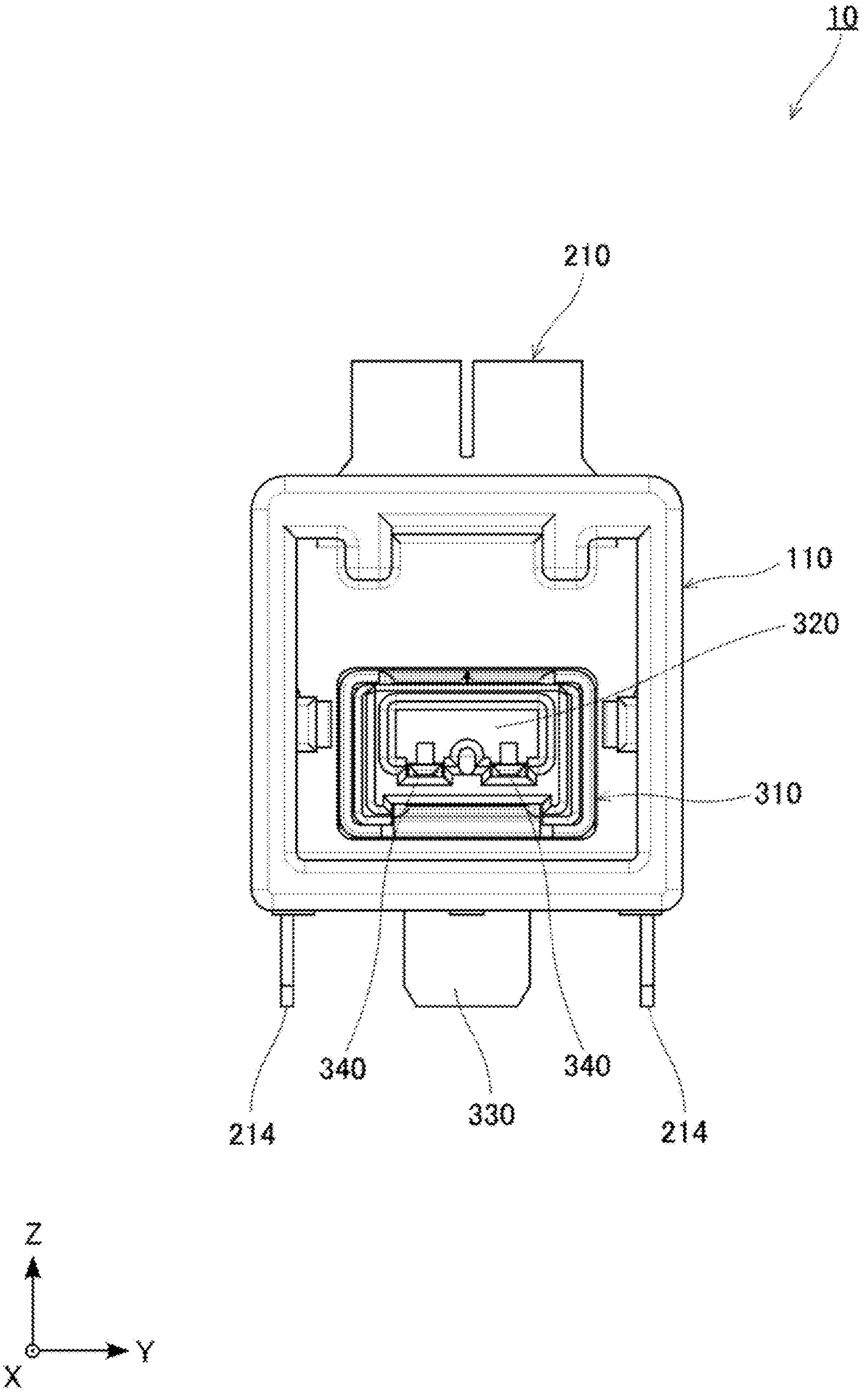
FIG. 3 is an elevation view of the shield-type connector in the embodiment.
Figure 4:
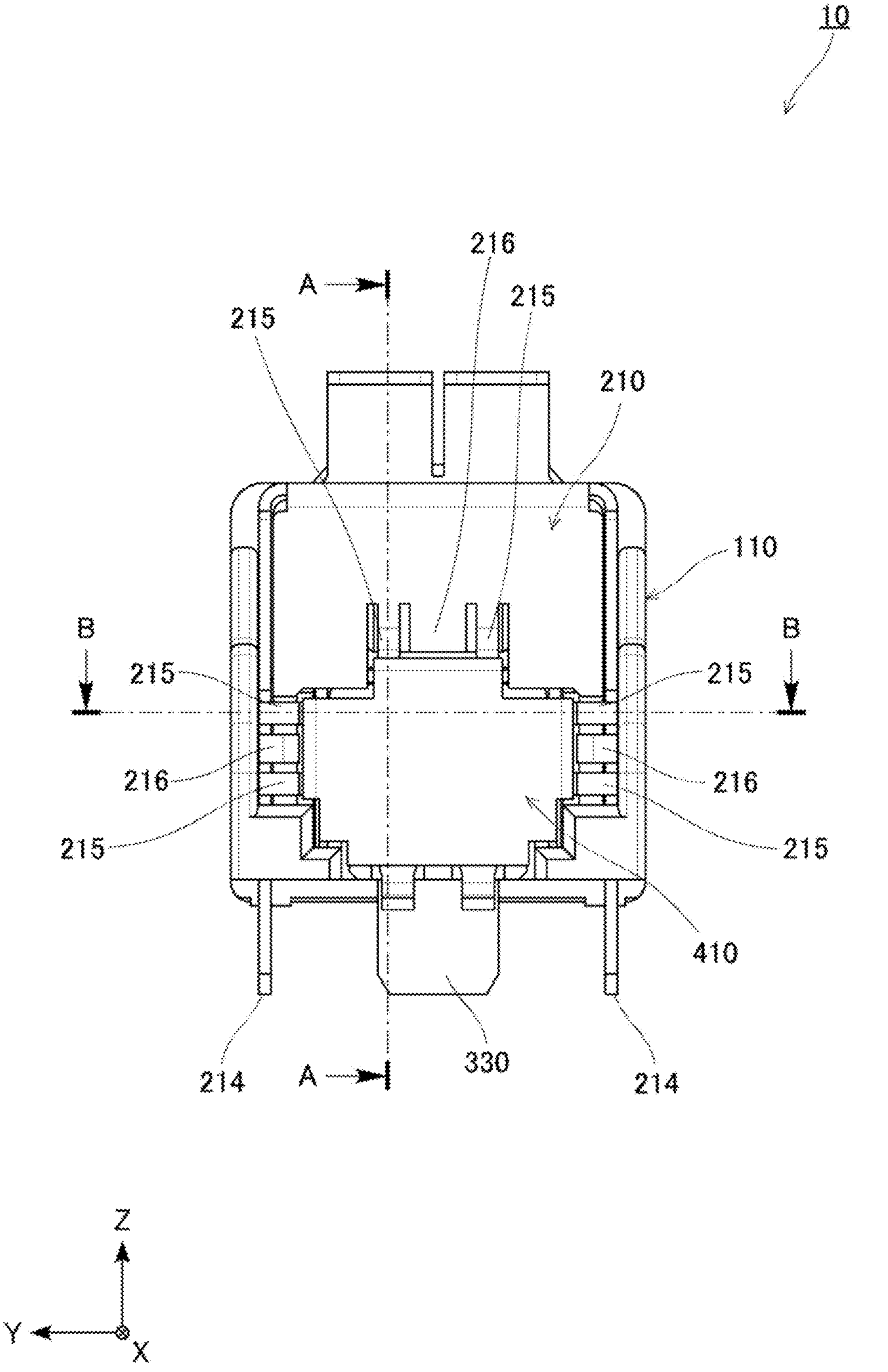
FIG. 4 is a back elevation view of the shield-type connector in the embodiment.
Figure 5:
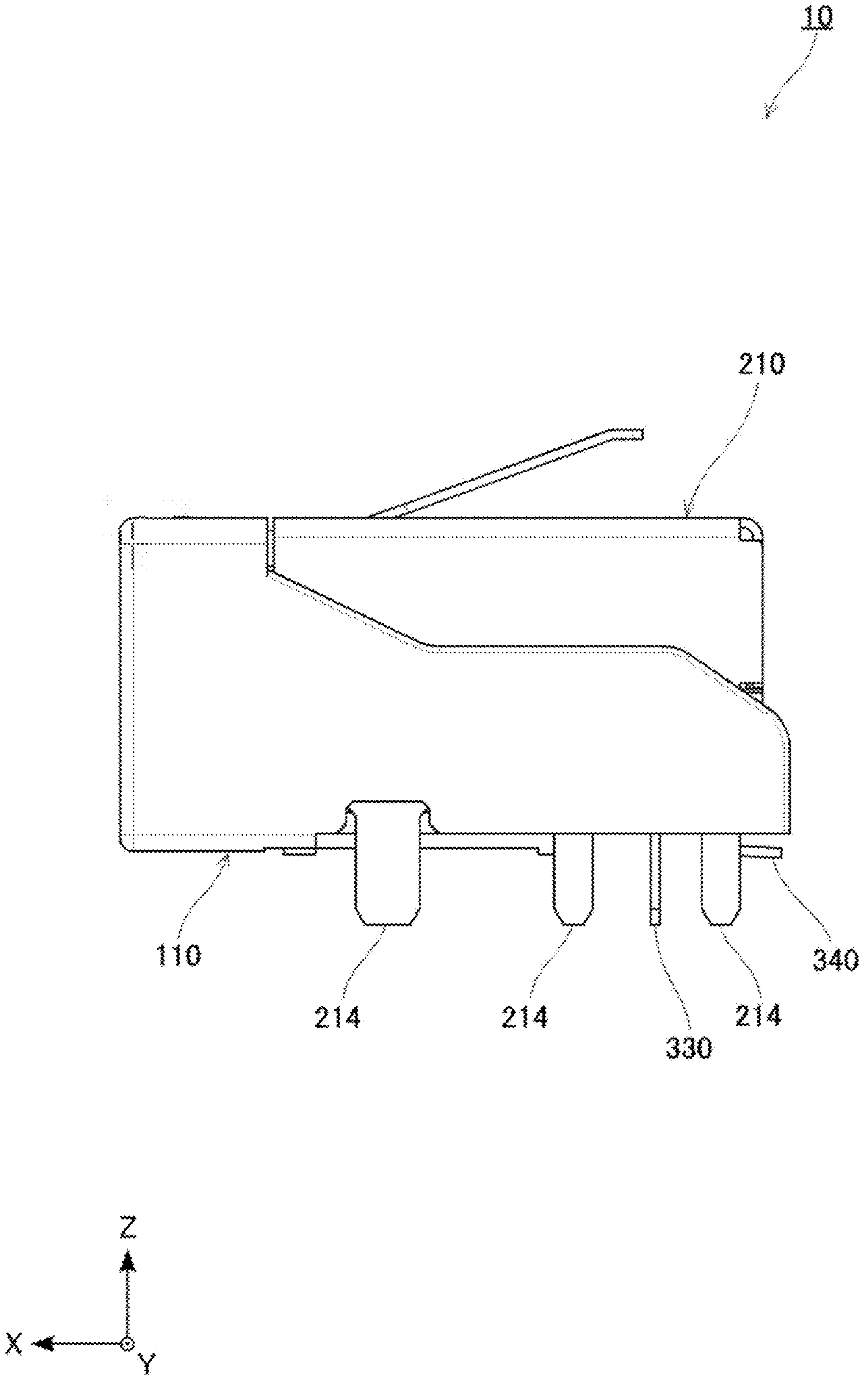
FIG. 5 is a right-side view of the shield-type connector in the embodiment.
Figure 6:
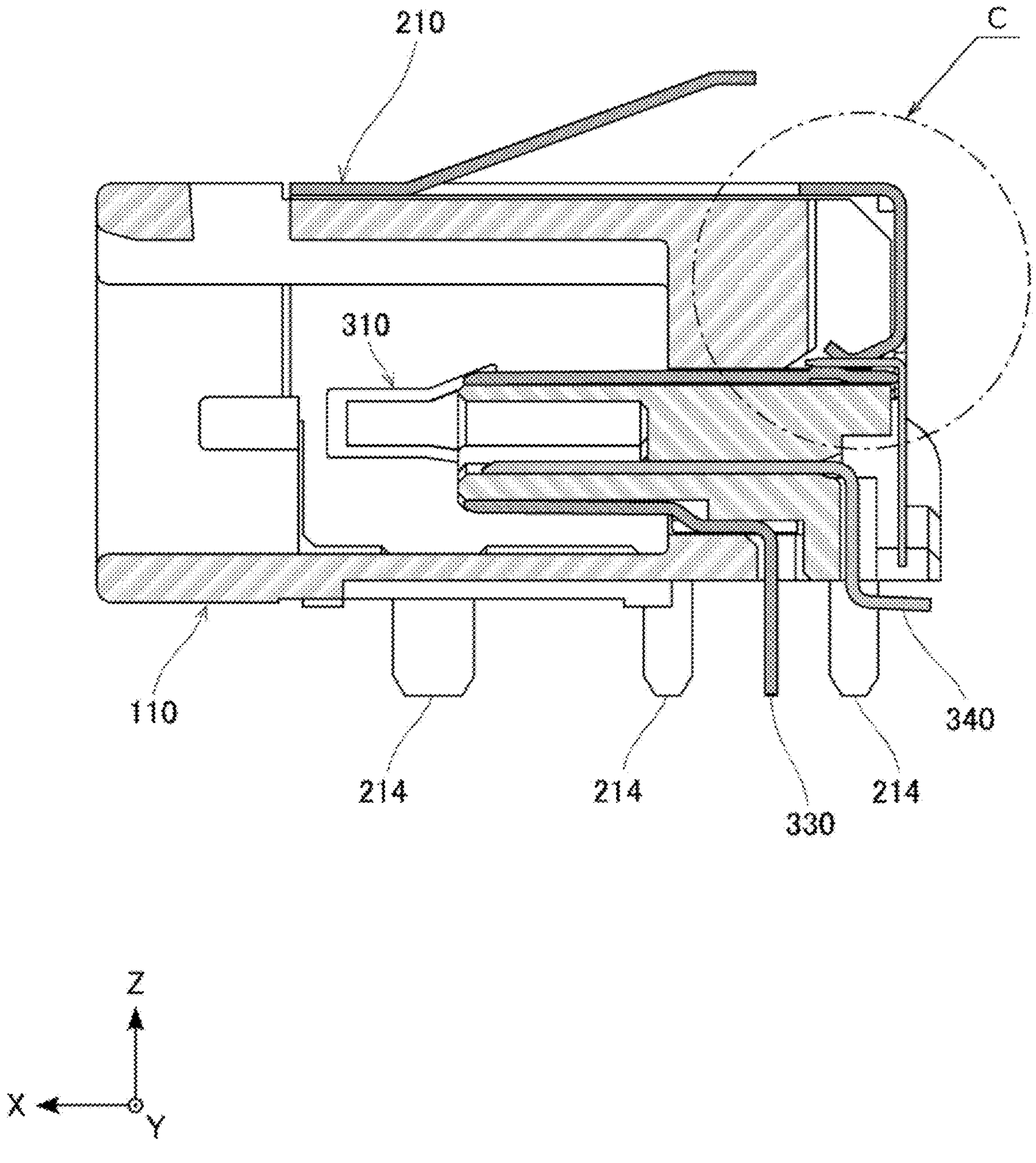
FIG. 6 is a sectional view showing a longitudinal view of a spot indicated by a line shown by reference characters A, A in FIG. 4.

With reference to FIG. 2 and FIG. 4, on the back surface side of the shield-type connector 10 in the embodiment, the outer shell 210 is provided so as to cover an upper half of a back surface, and the cover shell 410 is provided so as to cover a lower half of the back surface. For enhancing the shield performance, it is necessary to prevent a gap from being made on the back surface side on which a plurality of members is connected. Hence, in the embodiment, shielding portions 216 are formed on the respective rear sides of the two side surfaces 211 constituting the outer shell 210 and the lower side of the one rear surface 213 (see FIG. 12 also). By forming the shielding portions 216, the outer shell 210 and cover shell 410 that are metal materials cover the back surface side of the shield-type connector 10 with no gap, and therefore it is possible to improve the shield performance of the shield-type connector 10 in the embodiment.

The shield-type connector 10 in the embodiment described with use of FIG. 1 to FIG. 14 has a structure in which the shield performance is increased, and therefore makes it possible to realize a shield-type connector in which the noise resistance performance is improved.

Further, in the embodiment, despite the structure of connecting the three kinds of members composed of metal materials: the spring plate shape portion 215 of the outer shell 210, the protrusion shape portion 335 of the inner shell 330 and the flat plate shape portion 415 of the cover shell 410, the ground connection is performed at many positions, and it is possible to realize a shield-type connector in which the noise resistance performance is enhanced.

Furthermore, in the embodiment, since the embodiment has the structure in which the three contact portions: the spring plate shape portion 215 of the outer shell 210, the protrusion shape portion 335 of the inner shell 330 and the flat plate shape portion 415 of the cover shell 410 are close to each other at the contact position, the ground conduction path is provided in the thickness direction of the contact portions, and it is possible to obtain a shield-type connector in which the shield performance is improved by shortening the path length. This structure contributes also to the reduction in the size of the shield-type connector 10.

Moreover, according to the shield-type connector 10 in the embodiment, the occupation region of the three contact portions: the spring plate shape portion 215 of the outer shell 210, the protrusion shape portion 335 of the inner shell 330 and the flat plate shape portion 415 of the cover shell 410 is small, and therefore it is easy to enhance the shield performance by increasing the number of the contact portions.

Next, an outline of a production process of the shield-type connector 10 in the embodiment will be described below.

As understood with reference to FIG. 11, the two metal terminals 340 are provided in the inner housing 320 by fitting the metal terminals 340 in the +X-direction along the first direction of the inner housing 320 from the rear side toward the front side, and the inner shell 330 is provided so as to cover the outer circumference surface of the inner housing 320 by fitting the inner shell 330 in the −X-direction along the first direction of the inner housing 320 from the front side toward the rear side, so that the assembly of the inner terminal portion 310 in the embodiment is completed.

Next, as understood with reference to FIG. 10, the inner terminal portion 310 can be provided within the opening of the outer housing 110, by fitting the inner terminal portion 310 in the +X-direction along the first direction of the outer housing 11 from the rear side toward the front side. Further, the outer shell 210 can be provided so as to cover the upper side of the outer housing 110 and the upper half of the back surface of the outer housing 110, by fitting the outer shell 210 in the −Z-direction that is the third direction of the outer housing 110 from the upper side toward the lower side. Furthermore, the cover shell 410 can be provided so as to cover the lower half of the back surface of the outer housing 110 on the back surface side of the inner terminal portion 310, by fitting the cover shell 410 in the +X-direction that is the first direction of the outer housing 110 from the rear side toward the front side. By this production process, the shield-type connector 10 in the embodiment is completed.

The preferred embodiment of the present invention has been described above. The technical scope of the present invention is not limited to the scope of the description about the above embodiment. For the above embodiment, various modifications or improvements can be made.

For example, in the above embodiment, as for the combination of contact portions, an example of the configuration of combining the three kinds of contact portions: the spring plate shape portion 215 formed on the outer shell 210, the protrusion shape portion 335 formed on the inner shell 330 and the flat plate shape portion 415 formed on the cover shell 410 has been shown. However, as the contact portion in the present invention, any one of the three kinds of shape portions; the spring plate shape portion 215, the protrusion shape portion 335 and the flat plate shape portion 415 can be arbitrarily selected, and all combinations of an identical kind of or different kinds of contact portions can be selected.

For example, each of the contact portion of the inner shell 330 and the contact portion of the outer shell 210 may be the spring plate shape portion, and the contact portion of the cover shell 410 may be the flat plate shape portion.

Figure 15:
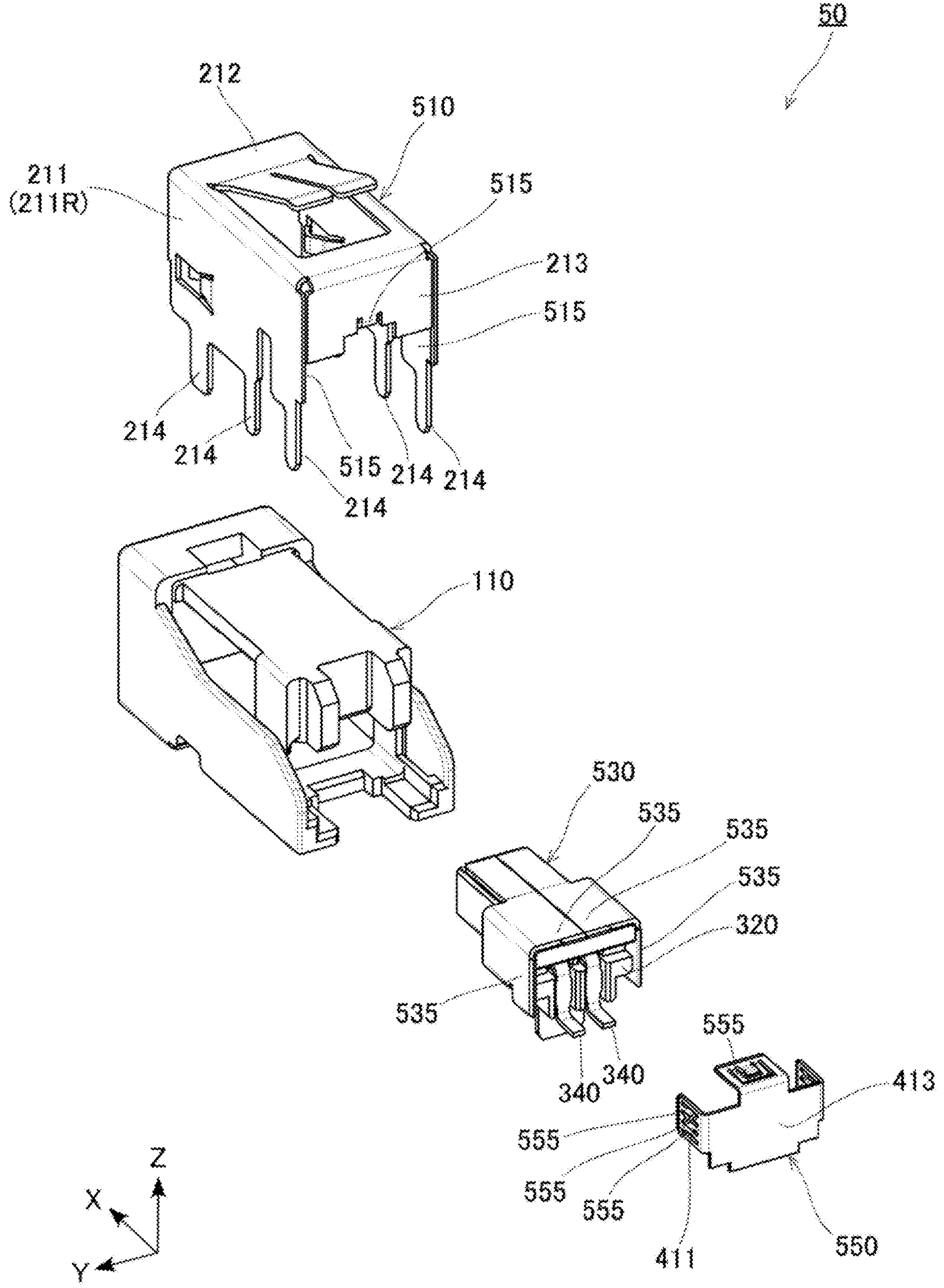
FIG. 15 is an exploded perspective view showing an example (first modification) of various modifications that can be adopted as the shield-type connector in the present invention.
Figure 16:
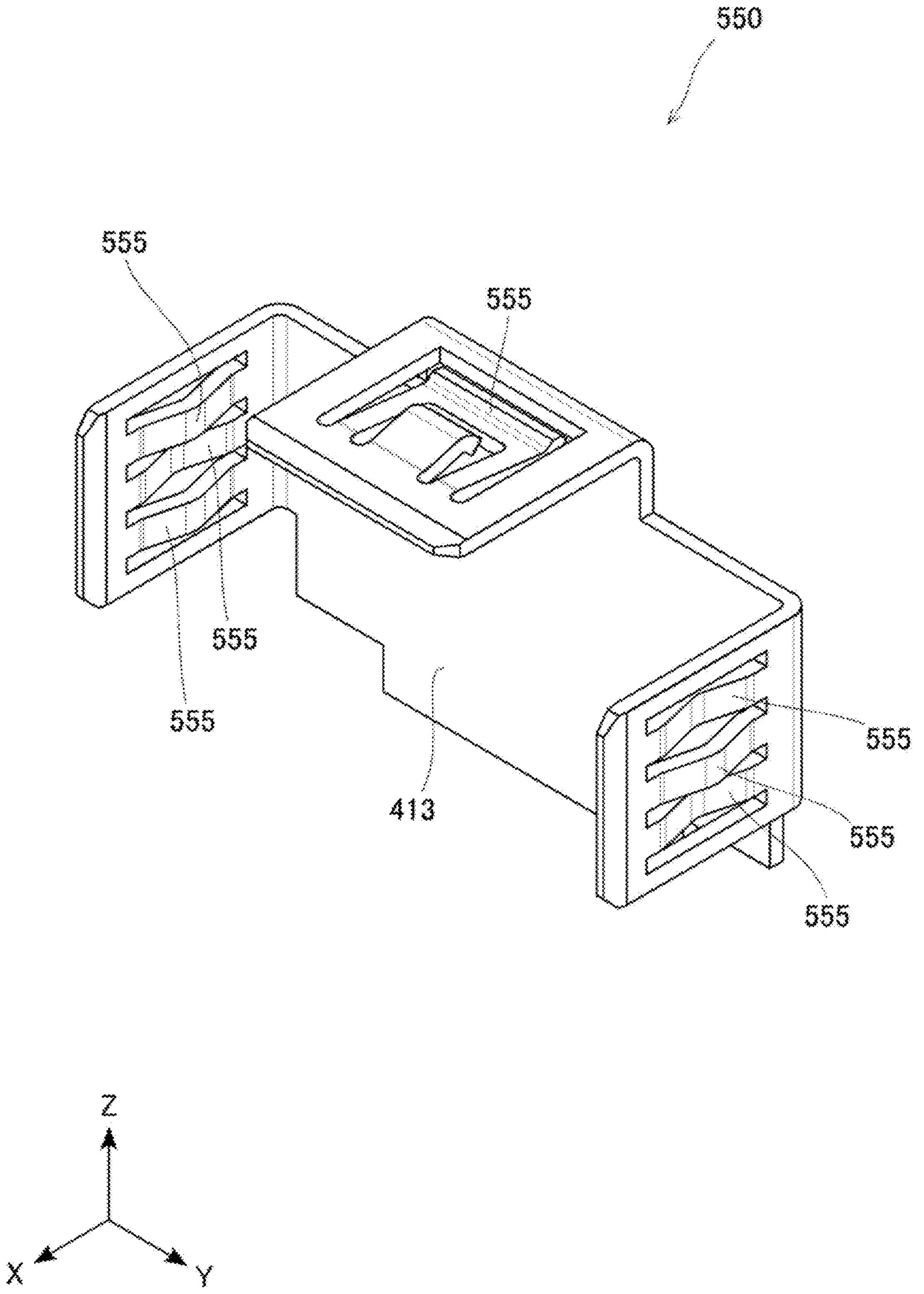
FIG. 16 is a perspective view of a cover shell constituting the shield-type connector in the first modification shown in FIG. 15 as viewed from an upper front right side.

Further, for example, in a shield-type connector 50 in a first modification shown in FIG. 15 and FIG. 16, there is shown an exemplary configuration in which a flat plate shape portion 515 is formed on an outer shell 510, a flat plate shape portion 535 is formed on an inner shell 530 and a spring plate shape portion 555 is formed on the cover shell 550. The spring plate shape portion 555 that is the contact portion of the cover shell 550 is inserted between the flat plate shape portion 535 that is the contact portion of the inner shell 530 and the flat plate shape portion 515 that is the contact portion of the outer shell 510, and thereby the elastic force of the spring plate shape portion 555 acts, so that a sure contact state among the inner shell 530, the outer shell 510 and the cover shell 550 is maintained. That is, even by the combination of the contact portions included in the shield-type connector 50 in the first modification, it is possible to realize a shield-type connector having the same shield performance as that in the above embodiment.

Further, in the above embodiment, in the configuration of the back surface side of the shield-type connector 10, the outer shell 210 is provided so as to cover the upper half of the back surface of the outer housing 110, and the cover shell 410 is provided so as to cover the lower half of the back surface of the outer housing 110. However, various modifications can be employed as the configuration of the back surface side of the shield-type connector in the present invention.

Figure 17:
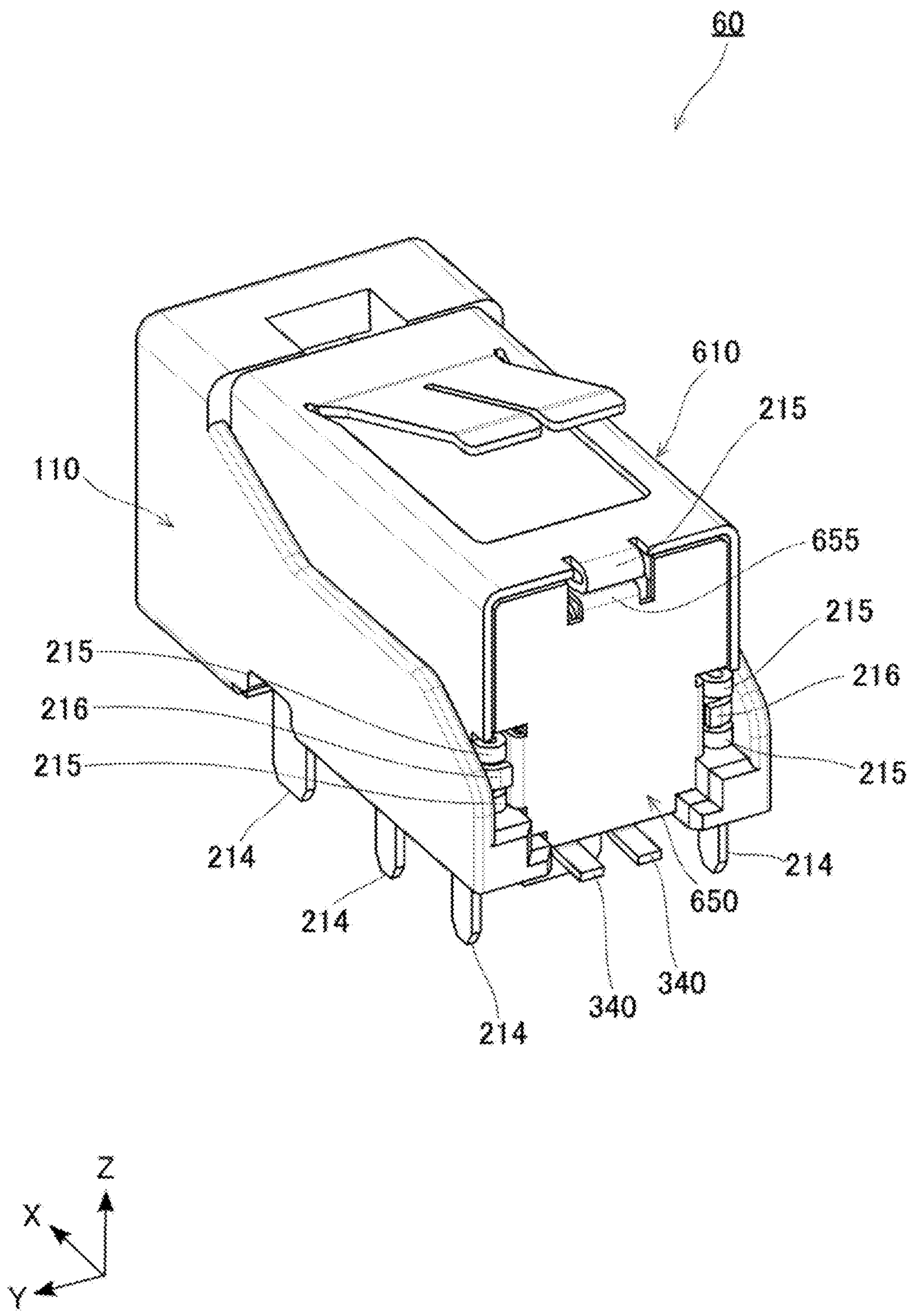
FIG. 17 is a perspective view of another example (second modification) of various modifications that can be adopted as the shield-type connector in the present invention, and this figure shows a perspective view of a shield-type connector in the second embodiment as viewed from an upper back right side.
Figure 18:
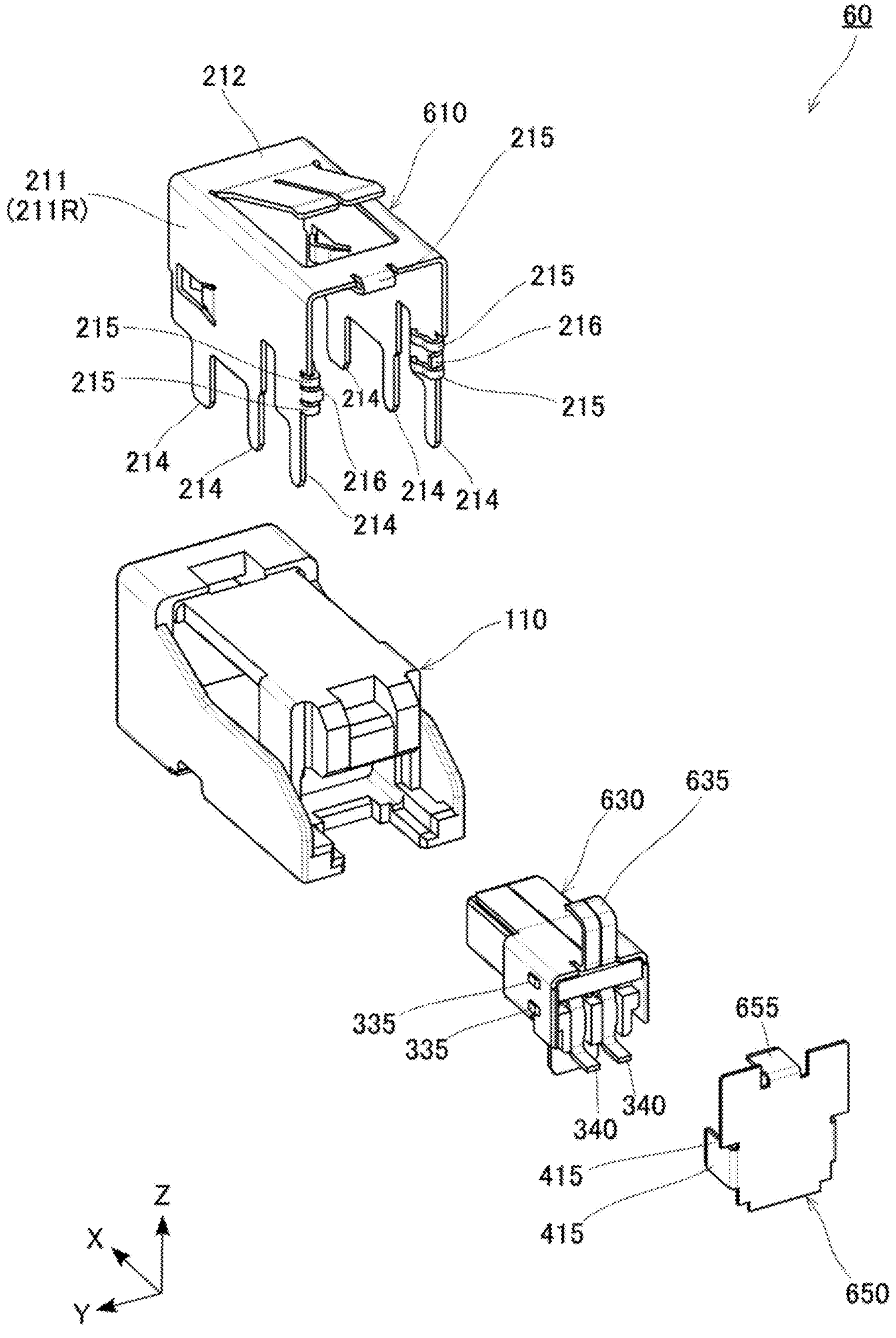
FIG. 18 is an exploded perspective view of the shield-type connector in the second modification shown in FIG. 17.
Figure 19:
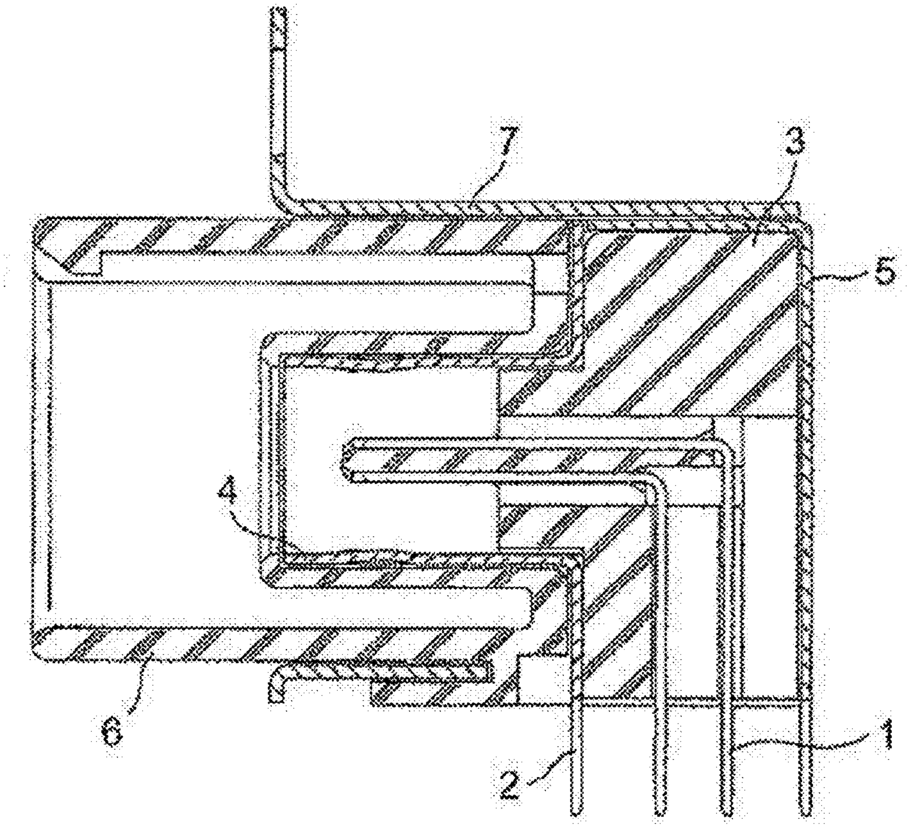
FIG. 19 is a longitudinal sectional view of a shield-type connector according to an invention in Japanese Patent Laid-Open No. 2005-38725.
Figure 20:
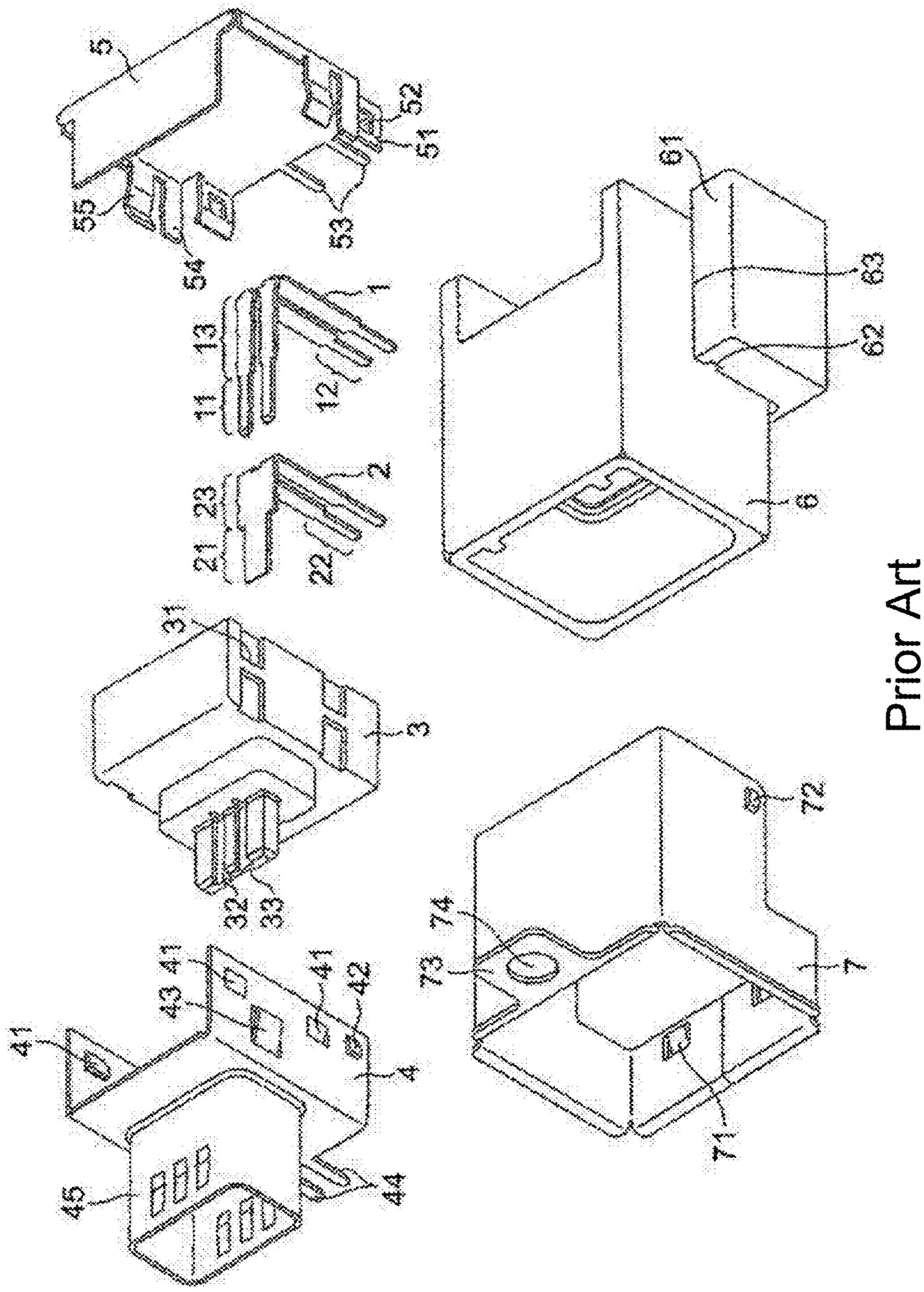
Prior Art FIG. 20
FIG. 20 is an exploded perspective view of the shield-type connector according to the invention in Japanese Patent Laid-Open No. 2005-38725.

For example, in a shield-type connector 60 in a second modification shown in FIG. 17 and FIG. 18, there is shown an exemplary modification in which the whole of the back surface of the shield-type connector 60 is covered by a cover shell 650. In the case of the second modification, an outer shell 610 is configured to cover the right and left side surfaces and top surface of the outer housing 110. Further, the contact portion on the top surface side of an inner shell 630 is formed as a spring plate shape portion 635, and on the top surface side of the shield-type connector 60, a flat plate shape portion 655 of the cover shell 650 is fit between the spring plate shape portion 215 of the outer shell 610 and a spring plate shape portion 635 of an inner shell 630, so that a sure contact state among the inner shell 630, the outer shell 610 and the cover shell 650 is maintained.

In FIG. 15 to FIG. 18, members identical or similar to members described in the above embodiment are denoted by identical reference characters, and descriptions of the members are omitted.

Various exemplary configurations that can be adopted as the shield-type connector according to the present invention have been described. From the description of the claims, it is clear that embodiments for which the modifications or improvements are made are also included in the technical scope of the present invention.

REFERENCE SIGNS LIST

10 shield-type connector
110 outer housing
210 outer shell
211 side surface
211R right side surface
211L left side surface
212 top surface
213 rear surface
214 leg portion
215 spring plate shape portion (contact portion, spring piece)
216 shielding portion
310 inner terminal portion
320 inner housing
330 inner shell
331 side surface
331R right side surface
331L left side surface
333 top surface
335 protrusion shape portion (contact portion)
340 metal terminal
410 cover shell
411 side surface
411R right side surface
411L left side surface
412 top surface
413 rear surface
415 flat plate shape portion (contact portion, flat plate)
50 shield-type connector (first modification)
510 outer shell
515 flat plate shape portion (contact portion, flat plate)
530 inner shell
535 flat plate shape portion (contact portion. flat plate)
550 cover shell
555 spring plate shape portion (contact portion, spring piece)
60 shield-type connector (second modification)
610 outer shell
630 inner shell
635 spring plate shape portion (contact portion, spring piece)
650 cover shell
655 flat plate shape portion (contact portion, flat plate)

What is claimed is:

1. A shield-type connector comprising:

an inner shell made of metal and configured to be included in an inner housing;

an outer shell made of metal and provided in configured to be included in an outer housing; and a cover shell made of metal and contacting with both of the inner shell and the outer shell, wherein the inner shell includes two side surfaces each of which includes at least one contact portion and a top surface that includes at least one contact portion, the outer shell includes two side surfaces each of which includes at least one contact portion and a top surface or a rear surface that includes at least one contact portion, the cover shell includes two side surfaces each of which includes at least one contact portion and a top surface that includes at least one contact portion, the contact portion of each of two side surfaces of the cover shell is inserted between the contact portion of each of two surfaces of the inner shell and the contact portion of each of two surfaces of the outer shell, and contacts with the contact portion of each of two surfaces of the inner shell and the contact portion of each of two surfaces of the outer shell, and the contact portion of the top surface of the cover shell is inserted between the contact portion of the top surface of the inner shell and the contact portion of the top surface or the rear surface of the outer shell, and contacts with the contact portion of the top surface of the inner shell and the contact portion of the top surface or the rear surface of the outer shell.

2. The shield-type connector according to claim 1, wherein:

each of the contact portions included in the inner shell, the outer shell and the cover shell is formed by one of three kinds of shape portions that include a spring plate shape portion having elastic force, a protrusion shape portion protruding to a contact side and a flat plate shape portion having a flat plate shape.

3. The shield-type connector according to claim 2, wherein:

one of the contact portion of the inner shell and the contact portion of the outer shell is the spring plate shape portion having the elastic force, and the other of the contact portion of the inner shell and the contact portion of the outer shell is the protrusion shape portion protruding to the contact side; and the contact portion of the cover shell is the flat plate shape portion having the flat plate shape.

4. The shield-type connector according to claim 2, wherein:

each of the contact portion of the inner shell and the contact portion of the outer shell is the spring plate shape portion having the elastic force; and the contact portion of the cover shell is the flat plate shape portion having the flat plate shape.

5. The shield-type connector according to claim 2, wherein:

each of the contact portion of the inner shell and the contact portion of the outer shell is the flat plate shape portion having the flat plate shape; and the contact portion of the cover shell is the spring plate shape portion having the elastic force.

6. The shield-type connector according to claim 2, wherein:

one of the contact portion of the inner shell and the contact portion of the outer shell is the spring plate shape portion having the elastic force, and the other of the contact portion of the inner shell and the contact portion of the outer shell is the flat plate shape portion having the flat plate shape; and the contact portion of the cover shell is the protrusion shape portion protruding to the contact side.

7. The shield-type connector according to claim 2, wherein:

the spring plate shape portion is a spring piece that has a cantilever shape and that extends from a rear side of the shield-type connector to a front side of the shield-type connector;

the flat plate shape portion is a flat plate that extends from the rear side of the shield-type connector to the front side of the shield-type connector; and the contact portion of the cover shell is inserted from the rear side of the shield-type connector toward between the contact portion of the inner shell and the contact portion of the outer shell.

8. The shield-type connector according to claim 1, wherein the top surface of the outer shell includes at least one contact portion, and the contact portion of the top surface of the cover shell is inserted between the contact portion of the top surface of the inner shell and the contact portion of the top surface of the outer shell, and contacts with the contact portion of the top surface of the inner shell and the contact portion of the top surface of the outer shell.

9. A shield-type connector comprising:

an inner housing including an inner shell made of metal;

an outer housing including an outer shell made of metal; and a cover shell made of metal and contacting with both of the inner shell and the outer shell, wherein the inner shell includes two side surfaces each of which includes at least one contact portion and a top surface that includes at least one contact portion, the outer shell includes two side surfaces each of which includes at least one contact portion and a rear surface that includes at least one contact portion and that covers an upper half of the outer housing, the cover shell includes two side surfaces each of which includes at least one contact portion, a top surface that includes at least one contact portion, and a rear surface that covers a lower half of the outer housing, and the contact portion of the cover shell is inserted between the contact portion of the inner shell and the contact portion of the outer shell, and contacts with the contact portion of the inner shell and the contact portion of the outer shell.

* * * * *